(12) United States Patent
Rutterman et al.

(10) Patent No.: US 6,295,401 B1
(45) Date of Patent: Sep. 25, 2001

(54) OPTICAL FIBER RIBBON CABLES

(75) Inventors: Daniel J. Rutterman; Shannon N. Harwell-Rutterman, both of Newton; Chad A. Burel, Hickory, all of NC (US)

(73) Assignee: Siecor Operations, LLC, Hickory, NC (US)

( * ) Notice: Subject to any disclaimer, the term of this patent is extended or adjusted under 35 U.S.C. 154(b) by 0 days.

(21) Appl. No.: 09/469,263

(22) Filed: Dec. 21, 1999

(51) Int. Cl.$^7$ .................................................. G02B 6/44
(52) U.S. Cl. .................... 385/114; 385/109; 385/113; 385/112
(58) Field of Search ................................. 385/114, 109, 385/110, 111, 112, 113, 100, 103, 104, 105, 106

(56) References Cited

U.S. PATENT DOCUMENTS

| | | | |
|---|---|---|---|
| 4,199,225 | 4/1980 | Slaughter et al. | 350/96.23 |
| 4,401,361 | 8/1983 | Slaughter | 350/96.23 |
| 4,709,984 | 12/1987 | Oestreich et al. | 350/96.23 |
| 5,212,756 | 5/1993 | Eoll | 385/114 |
| 5,598,498 | 1/1997 | Comezzi | 385/114 |
| 5,621,842 * | 4/1997 | Keller | 385/114 |
| 5,966,489 | 10/1999 | Harwell et al. | 385/114 |
| 6,185,352 * | 2/2001 | Hurley | 385/114 |

FOREIGN PATENT DOCUMENTS

| | | |
|---|---|---|
| 0 428 036 A2 | 5/1991 | (EP) . |
| 0 764 863 A1 | 9/1995 | (EP) . |
| 2122767 A * | 1/1984 | (GB) . |

OTHER PUBLICATIONS

Siecor Cable Product Code Guidebook, Flame–Retardant Cables, pp. 24 and 26, Jul. 1997.
Siecor Product Information, Plenum Ribbon Interconnect Cables, Nov. 1998.
Siecor Product Information, Non–Plenum Ribbon Interconnect Cables, Sep. 1998.

* cited by examiner

Primary Examiner—Cassandra Spyrou
Assistant Examiner—Leo Boutsikaris
(74) Attorney, Agent, or Firm—Timothy J. Aberle

(57) ABSTRACT

A fiber optic cable having optical sub-units each respectively including at least one optical fiber ribbon. The optical sub-units are removably connected together by a web of jacketing material. The optical fiber ribbons are generally twisted about their respective longitudinal axes by stranded strength fibers disposed about the optical ribbons. The fiber optic cable can be used as a stand alone component or, for example, in fan-out or break-out cables.

13 Claims, 2 Drawing Sheets

OPTICAL FIBER RIBBON CABLES

The present invention relates to optical fiber cables, and, more particularly, to optical fiber cables having at least one optical fiber ribbon therein.

Conventional fiber optic cables include optical fibers that conduct light in the transmission of voice, video, and data information. Optical cables have the advantages of large bandwidth and low power loss. Typical applications for optical cables include fiber-to-the-curb (FTTC), fiber-to-the-home (FTTH), fiber-to-the-desk (FTTD), plenum, riser, and local area networks (LANs). In a premises environment, optical zipcord cables can be used to interconnect operating equipment, for example, computers, modems, and telephones. For example, Operating Equipment Manufacturers (OEMs) may require low-cost, optical interconnect cables for use in transceiver applications.

Transceiver applications require sufficient space between fibers to avoid electrical crosstalk. Opto-electrical and electro-optical transducer components, for example, are used in such systems to interface between electrical and optical modes of signal transmission. Electrical systems, however, may experience crosstalk between the signal wires thereof. This type of electrical crosstalk occurs due to electromagnetic fields surrounding the transmitting wires. The electromagnetic fields of one circuit induce currents and electromotive forces in adjacent circuits. For example, electrical crosstalk affecting a telephone line may result in the undesired mixing of caller conversations. Spacing the electrical wires of different circuits tends to reduce electrical crosstalk. On the other hand, because optical-based systems use confined light as the information carrying medium rather than electricity, optical-based systems are not as susceptible to crosstalk and therefore do not require a significant crosstalk type spacing between the optical fibers.

Opto-electrical and electro-optical transducers generally require electrical wires to be spaced apart sufficiently enough to avoid crosstalk. For convenience, respective ends of optical fibers in single fiber cables are connected to such transducers by placing them in housings comprising spaced-apart, fiber receiving apertures. Another method is to connectorize a two-fiber optical ribbon with a 250 μm spacing between the fibers. Such conventional methods can be relatively expensive in respect of installation and material costs because two fibers must be individually connectorized. Another method is to connectorize a 2-fiber optical ribbon with a 750 μm spacing to a multi-fiber connector, as described in U.S. Pat. No. 5,966,489 which is incorporated by reference herein. The multi-fiber ferrule separates the fibers at a 750 μm spacing.

SUMMARY OF THE INVENTION

One aspect of the present invention is a fiber optic cable comprising at least one optical sub-unit with a jacket and an optical fiber ribbon therein, the optical fiber ribbon having a longitudinal axis. The sub-units include strength fibers, the strength fibers generally surrounding and contacting the optical fiber ribbon in the jacket and being stranded about the optical fiber ribbon resiliently twisting the optical fiber ribbon about the longitudinal axis thereof.

Another aspect of the invention is a fiber optic zipcord cable, comprising optical sub-units with respective jackets connected by a frangible section, and respective optical fiber ribbons in the sub-units, the optical fiber ribbons each having a longitudinal axis. The strength fibers are respectively disposed in the sub-units and generally surround the optical fiber ribbons and resiliently twist the optical fiber ribbons about their respective longitudinal axes.

Another aspect of the invention is a method of making an optical fiber cable, comprising the steps of: stranding strength fibers about an optical fiber ribbon causing the optical fiber ribbon to be generally twisted about its longitudinal axis; and extruding a molten jacketing material about the stranded strength fibers and the twisted optical fiber ribbon.

BRIEF DESCRIPTION OF THE DRAWING FIGURES

DETAILED DESCRIPTION OF THE INVENTION

Figure 1:
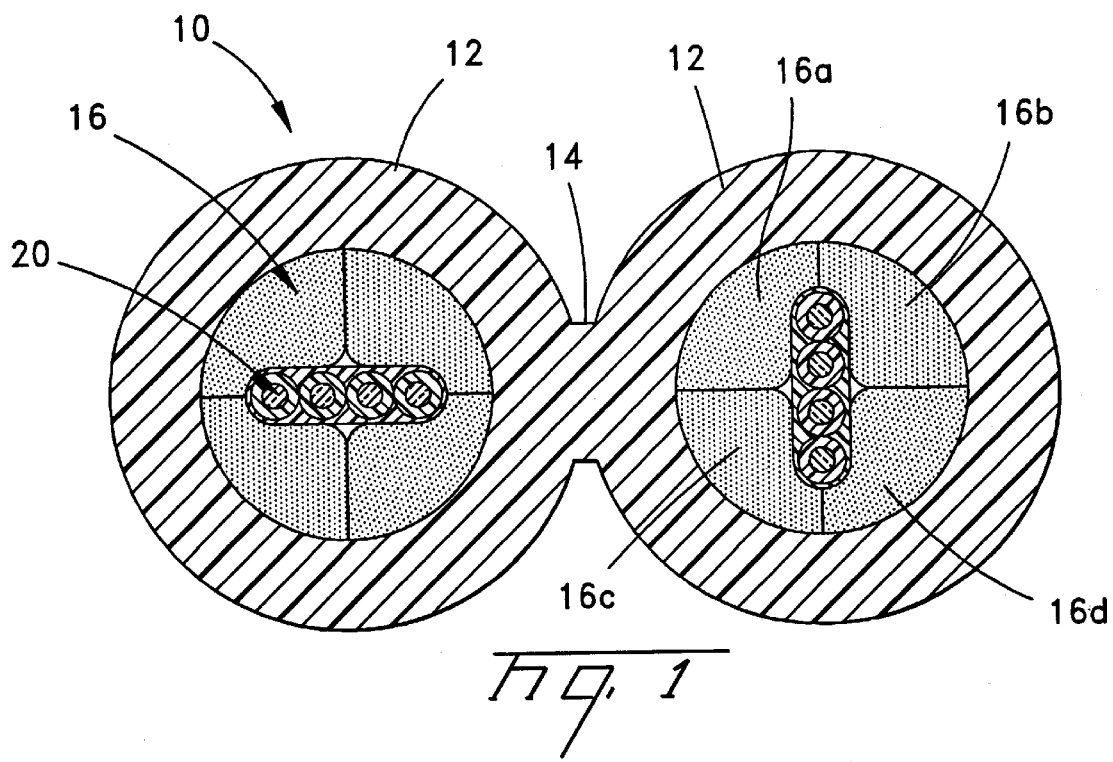
FIG. 1 is a schematic cross sectional view of a fiber optic cable according to the present invention.
Figure 2:
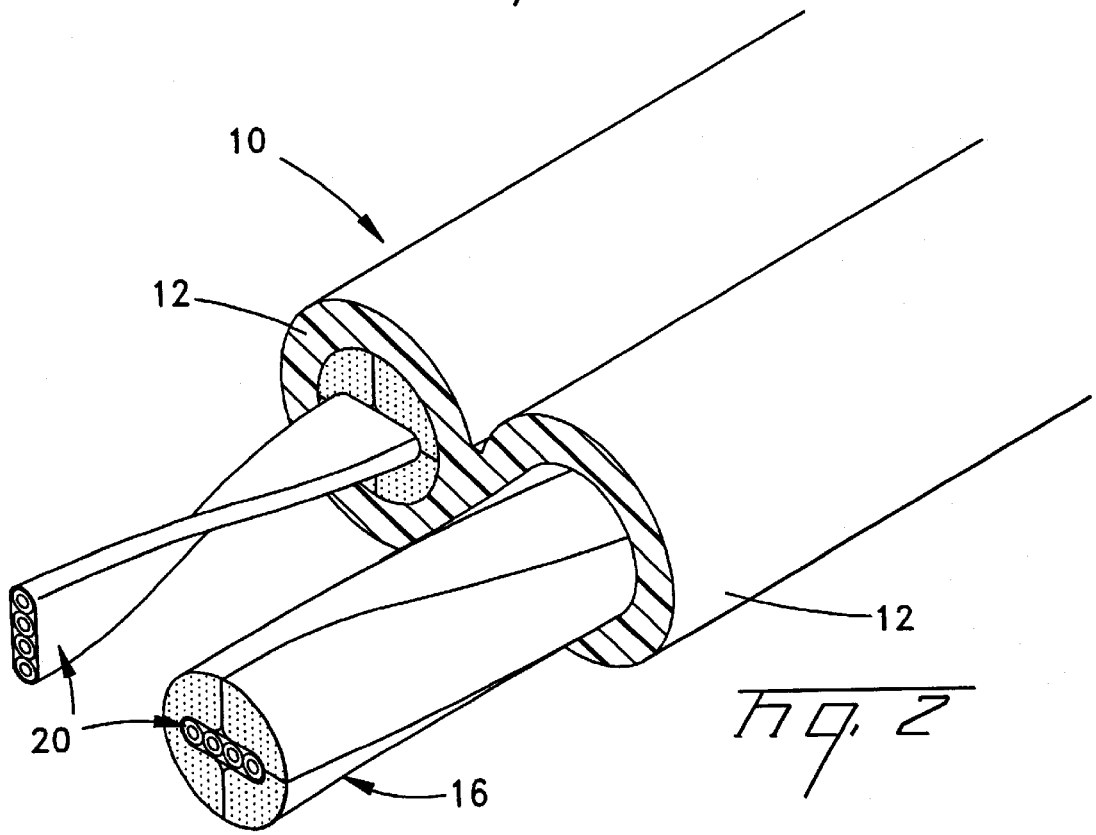
FIG. 2 is a schematic isometric view of the fiber optic cable of FIG. 1.
Figure 3:
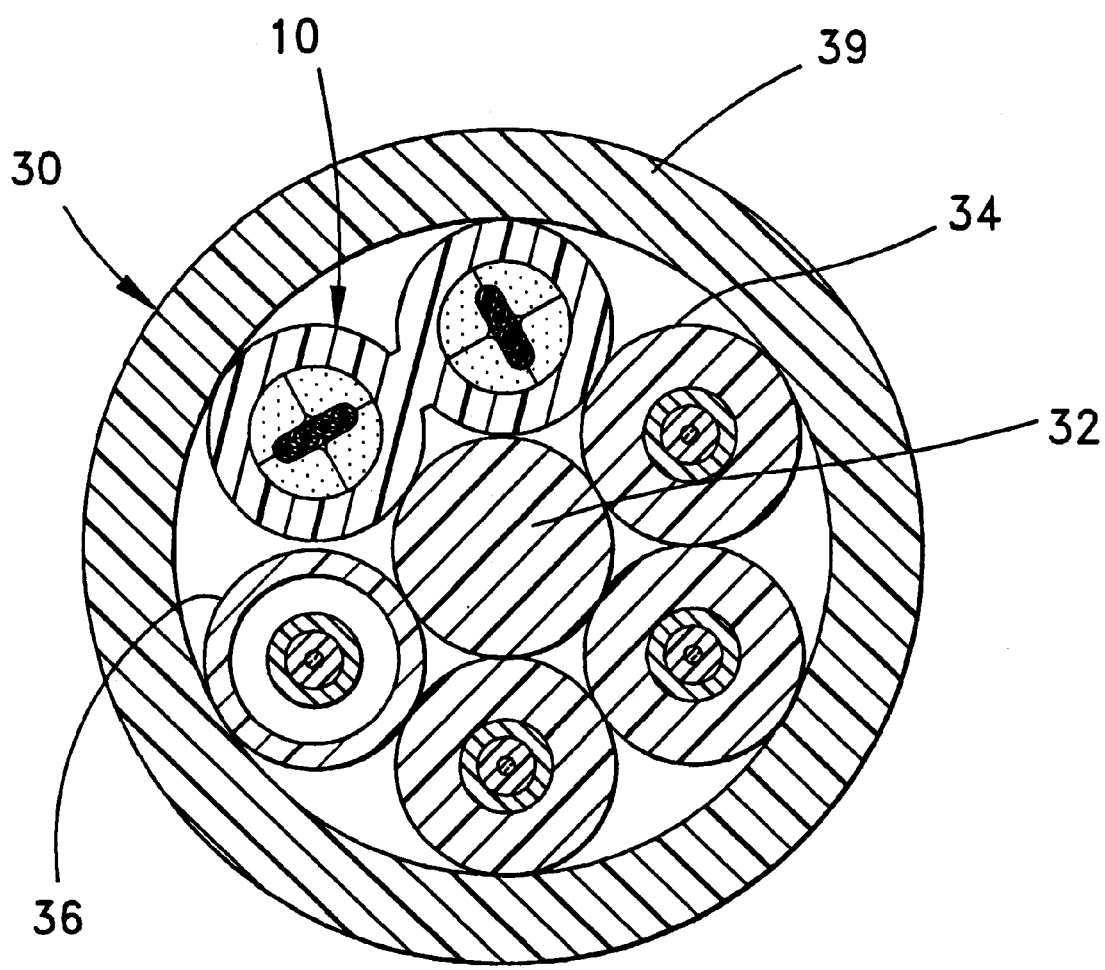
FIG. 3 is a cross sectional view of a fan-out cable including a fiber optic cable as shown in FIG. 1.

With reference to FIGS. 1–3, low-cost fiber optic cables 10 and 30 according to the present invention for use in, for example, FTTC, FTTH, FTTD, plenum, riser, or LAN applications will be described. The present invention can be practiced, for example, as a fiber optic zipcord cable 10 (FIG. 1) having optical sub-units 12 comprising respective jackets. Sub-units 12 can be separably connected to each other by extrusion or welding portions of the jackets together. Preferably, sub-units 12 are connected by a web 14 that functions as a frangible section formed during. extrusion of the jackets.

Optical sub-units 12 preferably each include at least one respective optical fiber ribbon 20 therein. Optical fiber ribbons 20 preferably include glass optical fibers, for example, one or more single mode optical fibers, or one or more multi-mode or multi-core optical fibers. Preferably, some of the fibers are mechanical fibers used for the spacing of other optical fibers rather than transmitting data. In a preferred embodiment, at least one and more preferably each respective sub-unit 12 includes an optical fiber ribbon 20 that is generally twisted about its longitudinal axis (FIG. 2). For example, an optical fiber ribbon 20 can be generally twisted about its longitudinal axis with a lay length of about 300 mm to about 1,000 mm. In this regard, optical ribbon 20 comprises a matrix material surrounding the optical fibers, the matrix material being resilient and flexible enough to permit twisting of the optical ribbon without damage to the matrix or optical fibers. An advantage of twisting the optical ribbon is that the cable will exhibit reduced non-preferential bend behavior, eliminating the potential for stress to be induced in the optical fibers as it is wrapped about a cable reel (not shown) or otherwise during or after cable installation.

Optical fiber ribbon 20 is preferably surrounded by at least one layer of strength fibers 16, for example, aramid or fiberglass strength fibers that essentially de-couple optical fiber ribbon 20 from the jacket. The strength fibers act as a tensile strength member, provide coverage from the outer jacket during the extrusion process, and twist the optical ribbons along their respective lengths. In a preferred embodiment, four ends of aramid fibers 16a, 16b, 16c, 16d are twisted about each of optical ribbons 20 (FIG. 1) causing the ribbons to resiliently twist. In an exemplary embodiment, the ends, or discrete yarns of aramid fibers, are stranded in a lay length of about 300 mm to about 400 mm. A preferred denier size of the aramid fibers is 2450d.

The jackets of optical sub-units 12 can be formed of any suitable thermoplastic material, for example, polyvinyl chloride (PVC), polyethylene (PE), a UV curable resin (e.g. acrylate), or a fluoro-compound. The jacket material can include one or more flame retardant additives, for example, for assuring satisfactory plenum (e.g. UL-910), riser (e.g. UL-1666), or low smoke zero halogen (LSZH) cable burn performance characteristics. In preferred embodiments, a riser application comprises a flexible PVC, a plenum application comprises a filled PVC, and a LSZH application comprises a non-halogenated jacketing material.

Multiple fiber optic cables 10 can be part of a fan-out cable 30 (FIG. 3), and can be longitudinally disposed adjacent to, or helically (unidirectionally) or SZ stranded about a central member 32. Central member 32 can be, for example, a fiber or a glass reinforced plastic rod, or fibers impregnated with a polymeric resin. Fiber optic cables 10 can be stranded with other fiber optic components, for example, tight buffered or loose buffered optical fiber components 34 or 36 and surrounded by a cable jacket 39.

Fiber optic cable 10 can be manufactured by passing optical fiber ribbons 20 and strength fibers 16 through an extruder and extruding the jackets therearound. Prior to extrusion, strength fibers 16 can be dusted with a talc powder to prevent sticking of the jackets to the strength fibers. Strength fibers 16 are stranded and are at least partially in contact with optical ribbons 20, whereby stranding of the strength fibers forces optical ribbons 20 to be resiliently twisted about their respective longitudinal axes. In addition, strength fibers 16 protect optical ribbons 20 from the molten outer jacket material during the extrusion process. Without proper coverage, optical ribbons 20 could intermittently tack to the jacket, which could produce high attenuation in the optical fibers if the cable were under tensile or compressive loads. The die profile can be shaped so that sub-units 12 have a generally round cross section. Alternatively, the die can be shaped to form other cross sectional shapes. In addition, the die preferably includes a profile that will result in the formation of web 14. In an exemplary embodiment, the outside diameter of sub-unit 12 is about 2.9 mm or less, and the wall thickness of the jacket is about 0.5 mm.

By pulling sub-units 12 apart, a craftsman can easily separate sub-units 12 as desired, remove a section of the jackets, and connectorize the optical fiber ribbons. The optical fiber ribbons can be factory or field connectorized to multi-fiber connectors. For example, if an office has two desktop computers, sub-units 12 can be routed to each computer by splitting cable 10 into individual sub-units 12 and operatively connecting optical ribbons 20 to each desktop computer.

In addition, bending induced attenuation changes are minimized by cables of the present invention. For example, the twist created in the optical fiber ribbons by the stranded strength fibers prevents the optical ribbons from being strictly aligned in a parallel relationship. Since the optical ribbons are resiliently twisted, bending of cable 10 can occur with minimal amounts of fiber stress and attenuation. In other words, applying strength fibers 16 helically generally about the longitudinal axis of the optical ribbons produces a resiliently flexible twist in the optical ribbons and prevents high attenuation in the fibers during bending.

The present invention has thus been described with reference to the foregoing embodiments, which embodiments are intended to be illustrative of the present inventive concepts rather than limiting. Persons of ordinary skill in the art will appreciate that variations and modifications of the foregoing embodiments can be made without departing from the scope of the appended claims. For example, an optical sub-unit 12 can include multiple optical fiber ribbons in a stack that is caused to be resiliently twisted about its longitudinal axis. In addition, fan-out or break-out cables of the present invention can include strength fibers adjacent to the cable sub-units. Where wavelength selection features are desired in the optical sub-unit, one or more periodic refractive indices can be written into the fiber before buffering, for example, as disclosed in U.S. Pat. No. 4,725,110, U.S. Pat. No. 5,620,495, U.S. Pat. No. 5,718,738, and/or U.S. Pat. No. 5,818,630, all of which are respectively incorporated by reference herein. For identification purposes, an identification means can be provided on either or both of the sub-units. The identification means can include different colors for the sub-units, one or more extruded or inked-on stripes, or any other suitable identification means. Fan-out cables according to the present invention can include fiber optic cable components, for example, ripcords or water blocking yarns.

Accordingly, what is claimed is:

1. A fiber optic cable, comprising:
   at least one optical sub-unit comprising a jacket and an optical fiber ribbon therein, said optical fiber ribbon having a longitudinal axis; and
   strength fibers, said strength fibers generally surrounding and contacting said optical fiber ribbon in said jacket; said strength fibers being stranded about said optical fiber ribbon resiliently twisting the optical fiber ribbon about said longitudinal axis thereof.

2. The fiber optic cable of claim 1, said strength fibers pressingly contacting said optical fiber ribbon so that said optical fiber ribbon is caused to be resiliently twisted.

3. The fiber optic cable of claim 1, said strength fibers being generally helically stranded and having a lay length of between about 300 mm to about 400 mm.

4. The fiber optic cable of claim 1, said optical fiber ribbon being generally twisted one complete revolution thereof for about every 1000 mm or less of cable length.

5. The fiber optic cable of claim 1, said strength fibers comprising an aramid material.

6. The fiber optic cable of claim 1, said jacket comprising a thermoplastic selected from the group consisting of PVC, PE, UV curable resins, and fluoro-compounds.

7. The fiber optic cable of claim 1, said optical fiber ribbon comprising at least one mechanical optical fiber.

8. A method of making an optical fiber cable, comprising the steps of:
   stranding strength fibers about an optical fiber ribbon so that said strength fibers are in contact with said optical fiber ribbon;
   said stranding of said strength fibers causing said optical fiber ribbon to be generally twisted about its longitudinal axis; and
   extruding a molten jacketing material about said stranded strength fibers and said twisted optical fiber ribbon.

9. A fiber optic zipcord cable, comprising:
   at least two optical sub-units comprising respective jackets connected by a frangible section, and respective optical fiber ribbons in said sub-units, said optical fiber ribbons each having a longitudinal axis; and
   strength fibers respectively disposed in said sub-units, said strength fibers generally surrounding and contacting said optical fiber ribbons;

said strength fibers being stranded about said optical fiber ribbons resiliently twisting the optical fiber ribbons about their respective longitudinal axes.

10. The fiber optic cable of claim 9, said strength fibers pressingly contacting said optical fiber ribbons so that said optical fiber ribbons are caused to be resiliently twisted.

11. The fiber optic cable of claim 9, said strength fibers being generally helically stranded and having a lay length of between about 300 mm to about 400 mm.

12. The fiber optic cable of claim 9, said optical fiber ribbons being generally twisted one complete revolution thereof for about every 300 mm to 1000 mm of cable length.

13. The fiber optic cable of claim 9, said strength fibers being stranded in opposing directions about said respective optical fiber ribbons so that said optical fiber ribbons have different directions of twist.

* * * * *